United States Patent
Ohta et al.

(10) Patent No.: US 7,920,570 B2
(45) Date of Patent: Apr. 5, 2011

(54) COMMUNICATION CONTROL APPARATUS AND COMMUNICATION TERMINAL

(75) Inventors: Yoshitaka Ohta, Osaka (JP); Hironori Nakae, Osaka (JP); Yosuke Ukita, Osaka (JP)

(73) Assignee: Panasonic Corporation, Osaka (JP)

( * ) Notice: Subject to any disclaimer, the term of this patent is extended or adjusted under 35 U.S.C. 154(b) by 953 days.

(21) Appl. No.: 11/793,976

(22) PCT Filed: Apr. 4, 2006

(86) PCT No.: PCT/JP2006/007130
§ 371 (c)(1),
(2), (4) Date: Jun. 25, 2007

(87) PCT Pub. No.: WO2006/107046
PCT Pub. Date: Oct. 12, 2006

(65) Prior Publication Data
US 2008/0019340 A1   Jan. 24, 2008

(30) Foreign Application Priority Data
Apr. 4, 2005   (JP) ................. 2005-107243

(51) Int. Cl.
H04L 12/56 (2006.01)
H04L 1/18 (2006.01)
H04J 3/24 (2006.01)
H04J 3/22 (2006.01)
G08C 25/02 (2006.01)
G06F 15/173 (2006.01)
G06F 15/16 (2006.01)

(52) U.S. Cl. ........ 370/394; 370/474; 370/465; 714/748; 714/749; 709/224; 709/225; 709/226; 709/227; 709/228

(58) Field of Classification Search .................. 370/394, 370/474, 465; 714/748, 749; 709/224–228, 709/237
See application file for complete search history.

(56) References Cited

U.S. PATENT DOCUMENTS
6,961,311 B2 * 11/2005 Rakotoarivelo et al. ...... 370/238
(Continued)

FOREIGN PATENT DOCUMENTS
JP    2002-335266    11/2002
(Continued)

OTHER PUBLICATIONS

Amendment 7: Medium Access Control (MAC Quality of Service (QoS) Enhancements, IEEE P802.11e/D11.0, Oct. 2004.

Primary Examiner — Jinsong Hu
Assistant Examiner — Marisol Figueroa
(74) Attorney, Agent, or Firm — Wenderoth, Lind & Ponack, L.L.P.

(57) ABSTRACT

A communication control apparatus for controlling communication by repeatedly sending a control signal to other apparatuses at a given time interval, the communication using a protocol that regulates transmissions of an acknowledgement as a receipt for one or more communication packets, and the control signal allocating, within the given time interval, two types of communication periods which are (i) a one-way communication period in which a one-way communication is performed and (ii) a two-way communication period in which a two-way communication is performed. The communication control apparatus determines, based on an occurrence ratio of the transmissions of the acknowledgement, a length of the one-way communication period, and sends the control signal that allocates a plurality of the one-way communication periods each of which has the determined length.

7 Claims, 5 Drawing Sheets

U.S. PATENT DOCUMENTS

| | | | |
|---|---|---|---|
| 7,385,976 B2 * | 6/2008 | Gu et al. | 370/389 |
| 7,463,892 B2 * | 12/2008 | Eiger et al. | 455/452.2 |
| 2003/0125087 A1 | 7/2003 | Shimizu | |
| 2003/0152054 A1 | 8/2003 | Hirano et al. | |
| 2007/0127410 A1 * | 6/2007 | Guo et al. | 370/328 |

FOREIGN PATENT DOCUMENTS

| | | |
|---|---|---|
| JP | 2003-198564 | 7/2003 |
| WO | 03/28314 | 4/2003 |

* cited by examiner

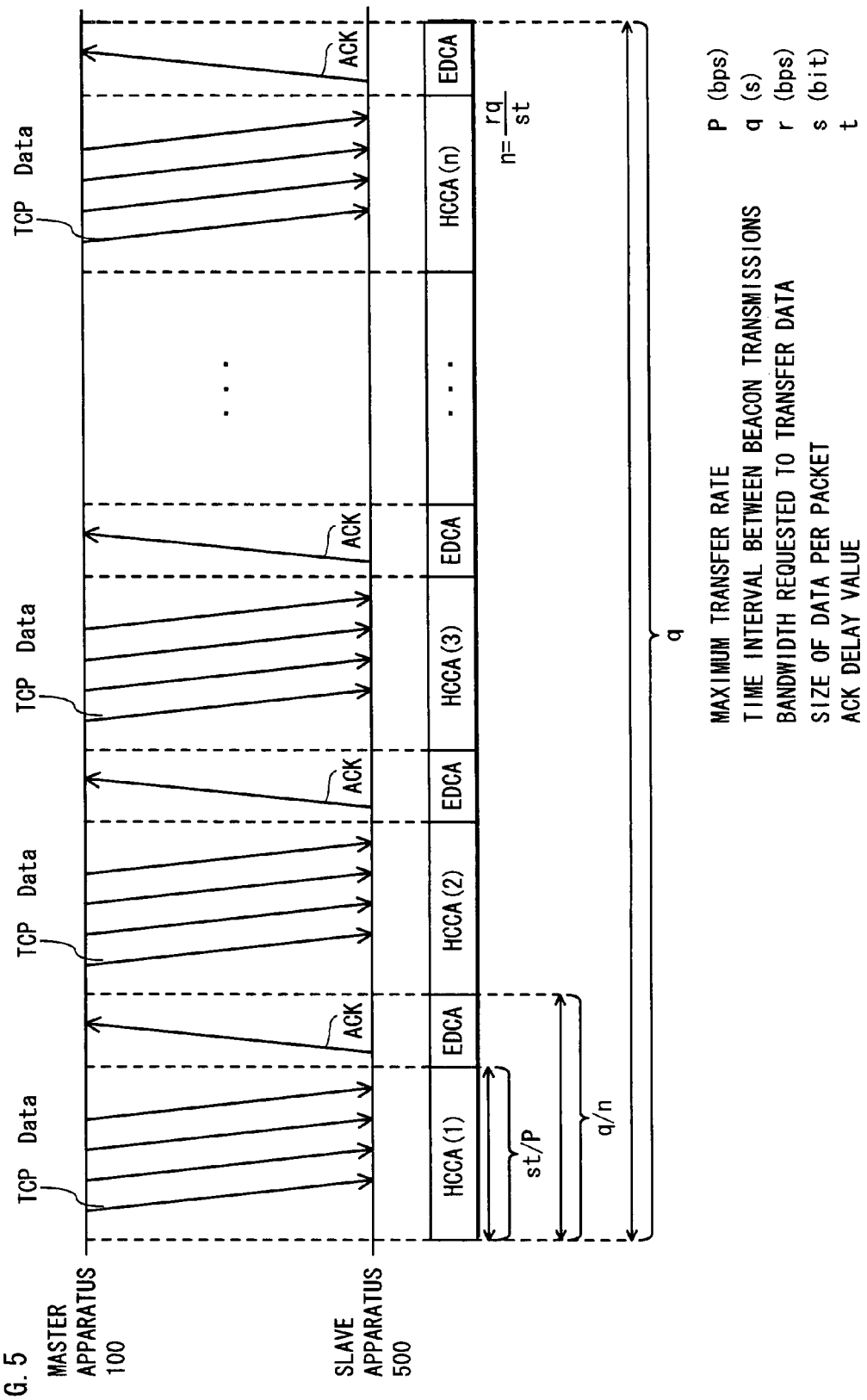

COMMUNICATION CONTROL APPARATUS AND COMMUNICATION TERMINAL

TECHNICAL FIELD

The present invention relates to a communication control apparatus that controls communication performed by each communication terminal by periodically transmitting a control signal thereto. Particularly, the present invention relates to a method for allocating bandwidth for controlling Quality of Service (QoS), in a case where communication is performed using a protocol, such as a transmission control protocol (TCP).

BACKGROUND ART

The IEEE 802. 11e standard formulates a technology for achieving QoS control in a wireless communication system, which is comprised of (i) a communication control apparatus that periodically transmits a control signal and (ii) a communication terminal that performs wireless communication in accordance with the control signal transmitted by the communication control apparatus (see Non-Patent Reference 1). Two access control methods are standardized in the IEEE 802. 11e: an enhanced distributed channel access (EDCA); and a hybrid coordination function controlled channel access (HCCA).

EDCA achieves the QoS control by giving high priority data a good chance of being transmitted. With the EDCA, each of the communication terminals obtains channel access with high probability. In contrast, HCCA achieves the QoS control by allocating a given bandwidth to a specific communication terminal. With the HCCA, a direction of data transmissions is limited to either one of "down-link" (from the communication control apparatus to the communication terminal) or "up-link" (from the communication terminal to the communication control apparatus). By entitling only one specific communication terminal to the channel access, the HCCA can guarantee allocation of the bandwidth to the specific communication terminal.

The communication control apparatus allocates two types of communication periods within a time interval between control signal transmissions, depending on requested bandwidth for transmitting data. One is an HCCA period in which communication is performed with the HCCA, and the other is an EDCA period in which the communication is performed with the EDCA. The communication control apparatus then transmits the control signal, including information indicative of the above allocations. Each of the communication terminals performs the communication in accordance with the above allocations of the HCCA and EDCA that is indicated by the control signal. In this structure, data that requires an adequate amount of bandwidth can be transmitted with the HCCA, so that the data transmission is not affected by other data transmissions. Meantime, data that does not require such a bandwidth can be transmitted with the EDCA.
Non-Patent Reference 1:
IEEE P802.11e/D11.0, "IEEE Standard for Information Technology—Telecommunications and information exchange between systems—Local and metropolitan area networks Specific requirements—Part 11: Wireless Medium Access Control (MAC) and Physical Layer (PHY) specifications: Amendment 7: Medium Access Control (MAC) Quality of Service (QoS) Enhancements", October 2004

DISCLOSURE OF THE INVENTION

The Problems the Invention is Going to Solve

As mentioned above, only a one-way communication can be performed in the HCCA period. In this light, the QoS control can be achieved in the HCCA period, if the communication is performed with use of a user datagram protocol (UDP), including a real-time transport protocol (RTP), that does not require an acknowledgment of whether the data has been received.

However, if the communication is performed with use of a protocol (e.g., TCP) that regulates data transmissions while transmitting/receiving the acknowledgement as a receipt for the data, a data transmitting apparatus cannot continue the data transmissions until it has received an ACK signal, which is the acknowledgement as a receipt for the data. On the other hand, in the HCCA period that only permits the one-way communication, a data receiving apparatus cannot transmit the ACK signal corresponding to the received data. As a result, when the communication is performed using protocols such as TCP, the following problem arises: despite the fact that the communication control apparatus has allocated the HCCA period to guarantee the bandwidth, the data is transmitted in an unstable condition due to an absence of the transmissions/receptions of the ACK signal.

In view of the above problem, it is an object of the present invention to provide a communication control apparatus and a communication terminal that can stably transmit data that requires an adequate amount of bandwidth, even in the case of using a protocol that regulates the data transmissions while transmitting/receiving the acknowledgement as the receipt for the data.

Means to Solve the Problems

To solve the above problem, the present invention provides a communication control apparatus for controlling communication by repeatedly sending a control signal to other apparatuses at a given time interval, the communication using a protocol that regulates transmissions of an acknowledgement as a receipt for one or more communication packets, and the control signal allocating, within the given time interval, two types of communication periods which are (i) a one-way communication period in which a one-way communication is performed and (ii) a two-way communication period in which a two-way communication is performed, the communication control apparatus comprising: a storing unit in which an occurrence ratio of the transmissions of the acknowledgement is stored; a determination unit operable to determine, based on the stored occurrence ratio of the transmissions of the acknowledgement, a length of the one-way communication period; and a communication control unit operable to generate and send the control signal that allocates a plurality of the one-way communication periods each of which has the determined length.

EFFECTS OF THE INVENTION

With the above structure, the communication control apparatus determines the length of the one-way communication period based on the occurrence ratio of the transmissions of the acknowledgement. The communication control apparatus can thereby allocate each of the communication periods within the given time interval so as to (i) send the one or more communication packets in the one-way communication period, and (ii) set the two-way communication period in which the acknowledgement, which is the receipt for the one or more communication packets, is transmitted.

Compared to a case where each of the communication periods is allocated only based on the bandwidth that is requested for transmitting the data, the above structure can reduce a situation where the communication packets cannot be transmitted successively because the acknowledgement is not transmitted/received in the one-way communication period. The above structure thus enables efficient and stable data transmissions.

The determination unit may determine, based on the stored occurrence ratio of the transmissions of the acknowledgement, the length of each of the one-way communication periods to be a time needed for the communication control apparatus to transmit data as the one or more communication packets, a size of the data corresponding to a predetermined number of the acknowledgements.

With the above structure, the communication control apparatus can allocate each of the communication periods such that the two-way communication period, in which the acknowledgement is transmitted, follows immediately after each of the one-way communication periods, in which the one or more communication packets, whose data size corresponds to a given number of the acknowledgements, are transmitted. This way a time frame in which the one or more communication packets cannot be transmitted due to an absence of the acknowledgement transmissions/receptions can be set within a shortest period possible. Accordingly, the communication control apparatus can transmit data efficiently and stably.

The data receiving apparatus stores the occurrence ratio of the transmissions of the acknowledgment. In contrast, there is a case where the data transmission apparatus does not have this occurrence ratio of the transmissions of the acknowledgement stored therein.

In view of this, the communication control apparatus may further include a measuring unit operable to, if transmitting the communication packets to one of the other apparatuses, measure the occurrence ratio of the transmissions of the acknowledgement based on a number of the received acknowledgements from the one of the other apparatuses, each of the received acknowledgements corresponding to a size of data that is transmitted as the one or more communication packets, wherein the measured occurrence ratio of the transmissions of the acknowledgement is stored in the storing unit.

The above structure allows the communication control apparatus to, if transmitting the communication packets to one of the other apparatuses, measure the occurrence ratio of the transmissions of the acknowledgement solely on its own. Therefore, even if the communication control apparatus has not stored therein the occurrence ratio of the transmissions of the acknowledgment, the communication control apparatus can transmit the data efficiently by measuring the occurrence ratio of the transmissions of the acknowledgement.

The communication control apparatus may further include an acquisition unit operable to, if transmitting the one or more communication packets to one of the other apparatuses, acquire the occurrence ratio of the transmissions of the acknowledgement from the one of the other apparatuses, wherein the acquired occurrence ratio of the transmissions of the acknowledgement is stored in the storing unit.

To solve the stated problem, the present invention may also provide a communication terminal for performing communication using a protocol that regulates transmissions of an acknowledgement as a receipt for one or more communication packets in accordance with the control signal sent by the above communication control apparatus, the communication terminal comprising: a communication unit operable to transmit and receive the one or more communication packets, and a notifying unit operable to, if receiving the communication packets from the communication control apparatus, notify the communication control apparatus of an occurrence ratio of the transmissions of the acknowledgement.

With this structure, the communication control apparatus, which controls the communication performed by the communication terminal, can obtain the occurrence-ratio of the transmissions of the acknowledgement from the communication terminal if transmitting the communication packets. Accordingly, the communication control apparatus can transmit data efficiently.

To solve the stated problem, the present invention may further provide a communication control method for controlling communication by repeatedly sending a control signal to other apparatuses at a given time interval, the communication using a protocol that regulates transmissions of an acknowledgement as a receipt for one or more communication packets, and the control signal allocating, within the given time interval, two types of communication periods which are (i) a one-way communication period in which a one-way communication is performed and (ii) a two-way communication period in which a two-way communication is performed, the communication control apparatus comprising: a storing step of storing an occurrence ratio of the transmissions of the acknowledgement; a determination step of determining, based on the stored occurrence ratio of the transmissions of the acknowledgement, a length of the one-way communication periods and a communication control step of generating and sending the control signal that allocates a plurality of the one-way communication periods each of which has the determined length.

To solve the stated problem, the present invention may provide a communication method of a communication terminal for performing communication using a protocol that regulates transmissions of an acknowledgement as a receipt for one or more communication packets, the communication being performed in accordance with the control signal sent by the communication control apparatus, the communication method comprising: a communication step of transmitting and receiving the one or more communication packets, and a notifying step of, if receiving the one or more communication packets from the communication control apparatus, notifying the communication control apparatus of an occurrence ratio of the transmissions of the acknowledgement.

BRIEF DESCRIPTION OF THE DRAWING

FIG. 5 shows a diagram indicating allocations of HCCA and EDCA periods within a time interval between control signal transmissions.

DESCRIPTION OF CHARACTERS

1 Network
2 Data Server

11 Antenna
12 Transmitting/Receiving Unit
13 Protocol Processing Unit
14 ACK Delay Value Management Unit
15 Bandwidth Setting Unit
16 Communication Control Unit
51 Antenna
52 Transmitting/Receiving Unit
53 Protocol Processing Unit
54 ACK Delay Value Setting Unit
55 Data Processing Unit
100 Communication Control Apparatus
500 Communication Terminals

BEST MODE FOR CARRYING OUT THE INVENTION

Embodiment

Figure 1:
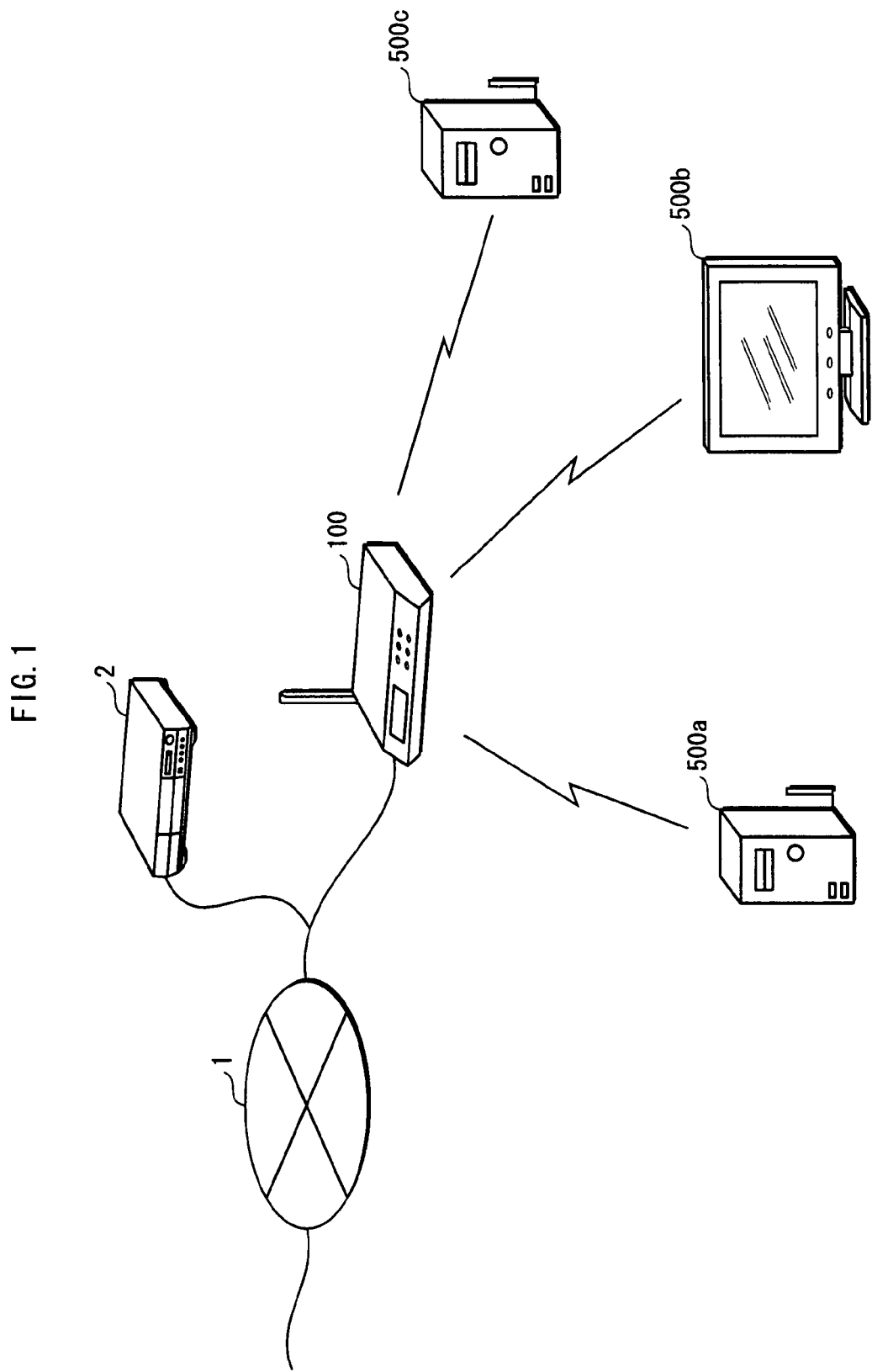
FIG. 1 shows a communication system of the present invention.

The following describes an embodiment of a communication system of the present invention with use of the drawings, the communication system including a communication control apparatus and a communication terminal.
<Overview>
FIG. 1 shows a communication system of the present invention.

The communication system of the present invention includes: a data server 2, a communication control apparatus 100, a plurality of communication terminals 500 (communication terminals 500a, 500b, 500c . . . ). The data server 2 and the communication control apparatus 100 are connected to an outside network 1. Each of the communication terminals 500 is connected to the network 1 via the communication control apparatus 100.

The data server 2 has stored therein audio-visual data and the like that have been acquired from outside sources, including the outside network 1.

The communication control apparatus 100, which is connected to the network 1, communicates with the data server 2 and each of the communication terminals 500. The communication apparatus 100 also sends a control signal to each of the communication terminals 500 periodically to control communication performed by each of the communication terminals 500.

The communication terminals 500 receive the control signal sent by the communication apparatus 100, and perform the communication according to the received control signal.

Note that in the present embodiment, the communication control apparatus 100 and each of the communication terminals 500 communicate with one another wirelessly, achieving the QoS control in line with the IEEE 802. 11e standard. The communication control apparatus 100 allocates two types of periods within the time interval between the control signal transmissions: an HCCA period in which communication is performed with the HCCA; and an EDCA period in which the communication is performed with the EDCA. The communication control apparatus 100 then transmits the control signal indicative of the above allocations. The communication terminals 500, which receive the control signal periodically, perform the wireless communication in accordance with the above allocations of the HCCA and EDCA indicated by the received control signal.

The present invention can be applied to the above communication system if the communication is performed with use of a protocol that regulates transmissions of an acknowledgement as a receipt for one or more communication packets. In the following description of the present invention, TCP is used as an example of the protocol that regulates transmissions of the acknowledgement.

More specifically, the communication system of the present invention partially makes up a home network and the like. In this home network, the communication terminals 500 request that the audio-visual data and the like, which has been stored in the data server 2, be transmitted thereto. The communication terminals 500 receive the data they requested via the communication control apparatus 100. Here, the communication terminals 500 transmit an ACK signal each time they receive a given size of data as packets. This transmission is based on an ACK delay value that indicates how much data in size (how many packets) the communication terminals 500 should receive before transmitting the ACK signal, namely the acknowledgement. For example, if the ACK delay value is "4," it means the communication terminals 500 transmit the ACK signal each time they receive four packets' worth of data; the communication terminals 500 thereby transmit the ACK signal each time they receive four packets.

The communication control apparatus 100 has the ACK delay value stored therein. Based on (i) bandwidth needed to transmit data requested by the terminals 500 and (ii) the ACK delay value, the communication control apparatus 100 allocates the HCCA period within the time interval to guarantee the above bandwidth.
<Structure>
Described below are structures of the communication control apparatus 100 and the communication terminals 500 of the present invention.

Figure 2:
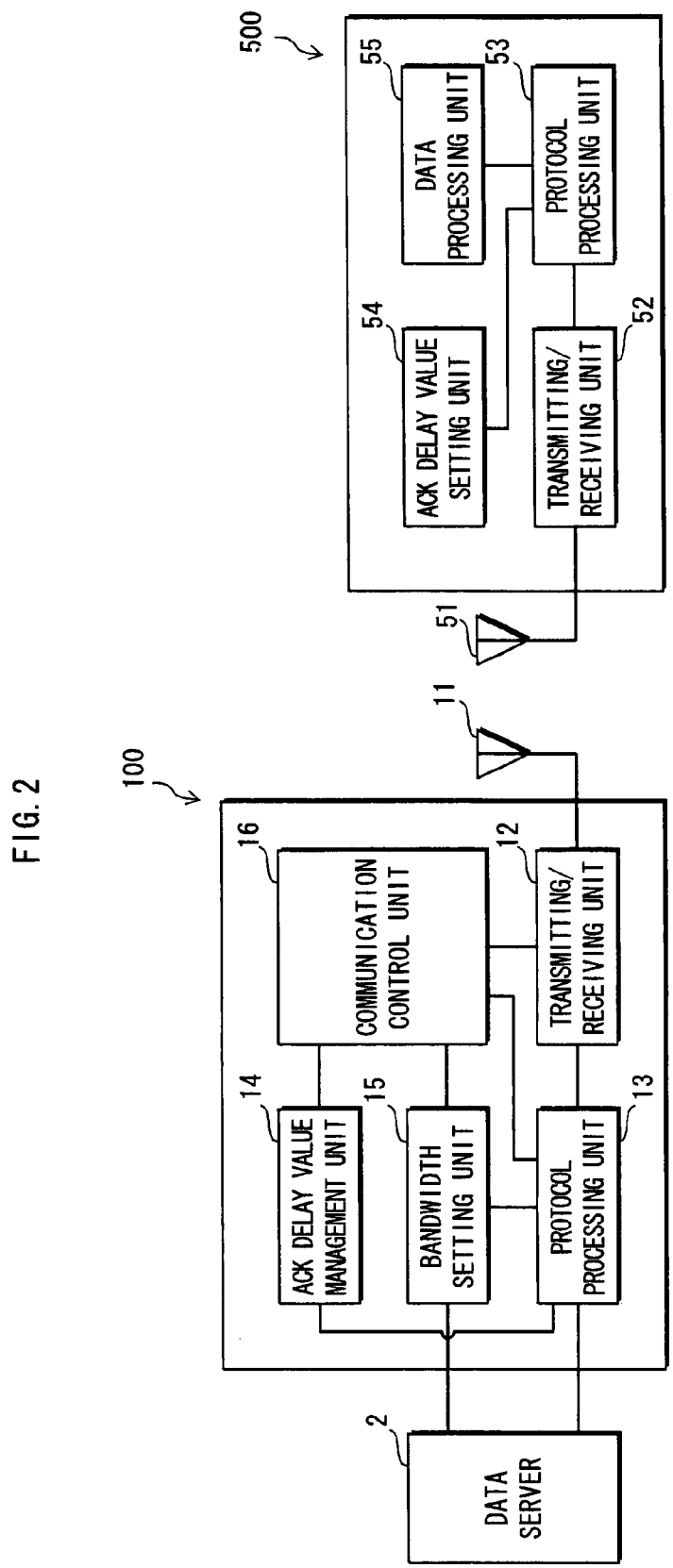
FIG. 2 is a functional block diagram illustrating structures of a communication control apparatus 100 and communication terminals 500 that constitute the communication system of the present invention.

FIG. 2 is a functional block diagram illustrating structures of the communication control apparatus 100 and the communication terminals 500 that constitute the communication system of the present invention.

As illustrated in FIG. 2, the communication control apparatus 100 includes: an antenna 11; a transmitting/receiving unit 12; a protocol processing unit 13; an ACK delay value management unit 14; a bandwidth setting unit 15; and a communication control unit 16. The communication control apparatus 100 is connected to the data server 2.

The antenna 11 sends and receives a wireless signal.

The transmitting/receiving unit 12 modulates data to be transmitted into a wireless signal, and sends the wireless signal via the antenna 11. The transmitting/receiving unit 12 also demodulates a wireless signal received via the antenna 11 into data, and outputs the data to the protocol processing unit 13.

As controlled by the communication control unit 16, the protocol processing unit 13 receives data to be transmitted (e.g., data that the data server 2 is going to transmit to other apparatus). The protocol processing unit 13 then adds a given protocol header (e.g., a TCP-header) to the data, and outputs the data to the transmitting/receiving unit 12. The protocol processing unit 13 also receives data from the transmitting/receiving unit 12. Here, in order to obtain the data, the protocol processing unit 13 performs tasks such as analyzing a header of the data. After obtaining the data, the protocol processing unit 13 outputs the data to the ACK delay value management unit 14 and the like.

The ACK delay value management unit 14 stores and manages the ACK delay value of the communication terminals 500, and outputs the ACK delay value to the communication control unit 16.

The bandwidth setting unit 15 manages bandwidth that is requested for transmitting data, and outputs the requested bandwidth to the communication control unit 16. The bandwidth setting unit 15 also receives from other apparatuses (e.g., the data server 2) information regarding the bandwidth requested for transmitting the data.

The communication control unit 16 controls communication performed between the communication control apparatus 100 and other apparatuses. Based on (i) the ACK delay value received from the ACK delay value management unit 14 and (ii) the requested bandwidth that is input from the bandwidth setting unit 15, the communication control unit 16 allocates two types of communication periods, namely the HCCA period and the EDCA period, within the time interval. The communication control unit 16 then performs processings (e.g., controlling the protocol processing unit 13) so as to send the control signal indicative of the allocations.

As illustrated in FIG. 2, each of the communication terminals 500 includes: an antenna 51; a transmitting/receiving unit 52; a protocol processing unit 53; an ACK delay value setting unit 54; and a data processing unit 55.

The antenna 51 sends and receives a wireless signal.

The transmitting/receiving unit 52 modulates data to be transmitted into a wireless signal, and transmits the wireless signal via the antenna 51. The transmitting/receiving unit 52 also demodulates a wireless signal received via the antenna 11 into data, and outputs the data to the protocol processing unit 53.

As controlled by the data processing unit 55, the protocol processing unit 53 adds a given protocol header (e.g., the TCP header) to data to be transmitted, and then outputs the data to the transmitting/receiving unit 52. The protocol processing unit 53 also receives data from the transmitting/receiving unit 52. Here, in order to obtain the data, the protocol processing unit 53 performs tasks such as analyzing a header of the data. After obtaining the data, the protocol processing unit 53 outputs the data to the data processing unit 55.

The ACK delay value setting unit 54 has the ACK delay value stored therein.

The data processing unit 55 controls data-related processings, including: transmitting the ACK signal; transmitting the ACK delay value to the communication control apparatus 100 by controlling the protocol processing unit 53; and outputting data that the communication terminals 500 have received to an outside display device.

Specifically, the communication control apparatus 100 and the communication terminals 500 described above are equipped with a central processing unit (CPU), a read only memory (ROM), a random access memory (RAM), a modulation/demodulation circuit, and so on. The communication control apparatus 100 and the communication terminals 500 operate in accordance with a program stored in the ROM.

<Data>

The following describes main data and data structure that are used in the present embodiment.

Figure 3A:
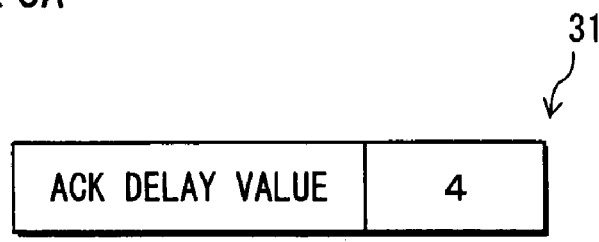
FIGS. 3A and 3B show diagrams pertaining to an ACK delay value.
Figure 3B:
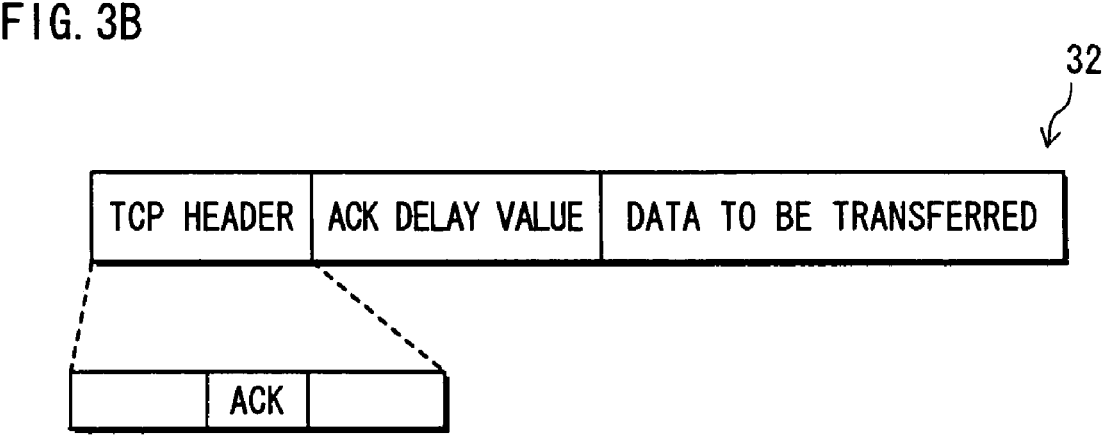

FIGS. 3A and 3B show diagrams pertaining to the ACK delay value.

In the present embodiment, it is assumed that the ACK delay value is the number of packets the communication terminals 500 receive before transmitting one ACK signal. FIG. 3A shows the ACK delay value being "4" as an example. Here, the communication terminals 500 transmit the ACK signal each time they receive four packets that are transmitted in accordance with TCP.

In the present embodiment, as shown in FIG. 3B, the communication terminals 500 inform the communication control apparatus 100 of the ACK delay value by transmitting data to the control apparatus 100, the data including the ACK delay value. FIG. 3B gives an example of the ACK delay value being informed to the communication control apparatus 100 together with each transmission of the ACK signal.

<Operation>

The communication control apparatus 100 of the present invention allocates, based on the ACK delay value, two types of communication periods within the time interval: the HCCA period and the EDCA period. Once the communication control apparatus 100 and the communication terminals 500 establish communication using TCP, the communication terminals 500 transmit a packet that includes the ACK signal to the communication control apparatus 100 (the packets correspond to data that the communication terminals 500 have received from the communication control apparatus 100). Here, the communication terminals 500 add the ACK delay value into the above packet so as to inform the communication control apparatus 100 of the ACK delay value. It is considered that the communication terminals 500 receive data that has required and has been provided with a given bandwidth, where as the communication control apparatus 100 uses the HCCA to transfer data that has required and has been provided with a given bandwidth.

Figure 4:
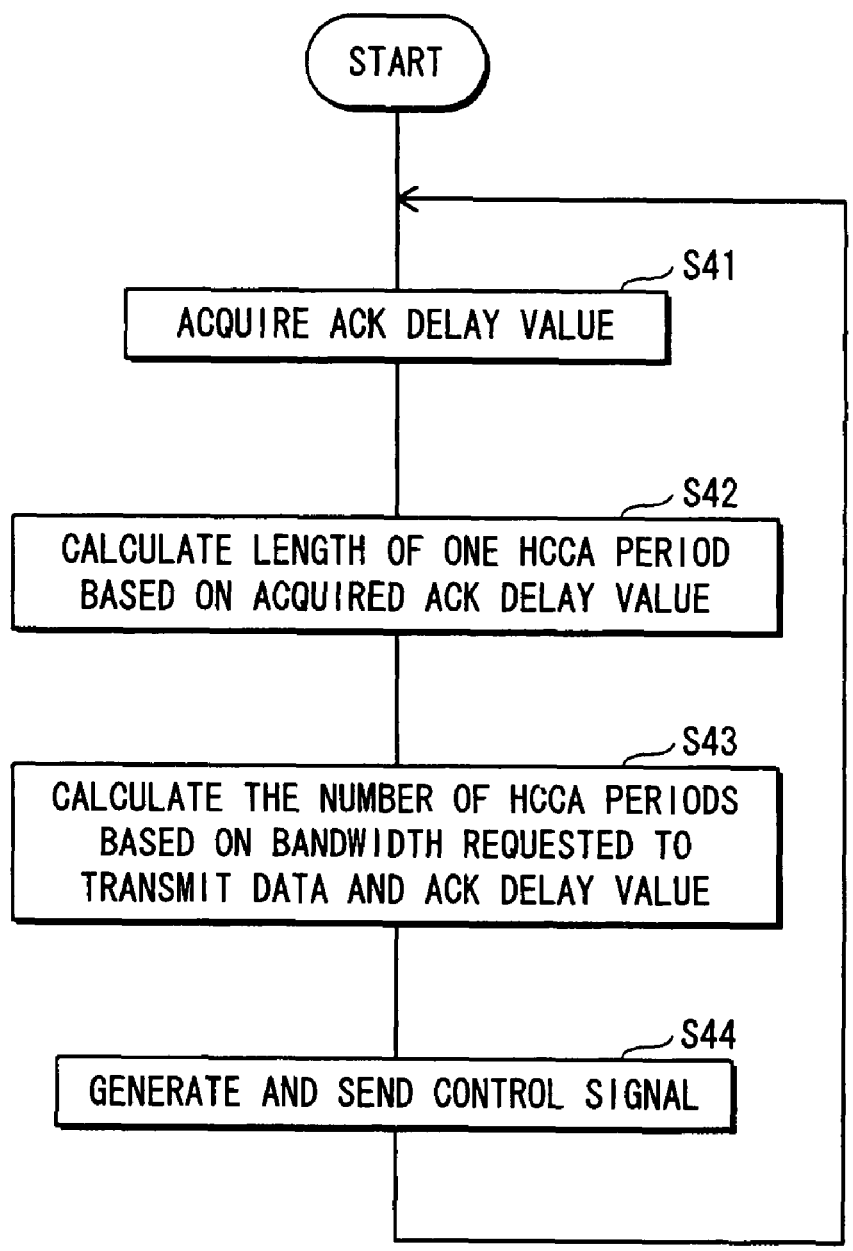
FIG. 4 is a flowchart illustrating a process in which the communication control apparatus 100 generates a control signal based on the ACK delay value and sends the control signal.

FIG. 4 is a flowchart illustrating a process in which the communication control apparatus 100 generates the control signal based on the ACK delay value and sends the control signal.

After starting the communication with the communication terminals 500, the communication control apparatus 100 receives the packet that includes the ACK signal and the ACK delay signal from the communication terminals 500. The protocol processing unit 13 obtains the ACK delay value included in the received packet by analyzing the packet, and then outputs the obtained ACK delay value to the ACK delay value management unit 14. The ACK delay value management unit 14 stores the ACK delay value therein (step S41).

Once the ACK delay value management unit 14 stores the ACK delay value therein, the communication control unit 16 receives (i) from the bandwidth setting unit 15 information regarding bandwidth that is requested for transferring data, and (ii) from the ACK delay value management unit 14 the ACK delay value. Based on the received ACK delay value, the communication control unit 16 calculates a length of one HCCA period (step S42).

FIG. 5 shows the allocations of the HCCA period and the EDCA period within the time interval. In FIG. 5, it is specifically provided that P (bps) is a maximum transfer rate indicating a maximum amount of data that can be transmitted through a channel; q (seconds) is a length of the time interval between the control signal transmissions; r (bps) is bandwidth that is requested for transferring data; s (bits) is a size of data per packet; and t is the ACK delay value. In this regard, the length of one HCCA period can be calculated by the following formula: st/P. That is, the length of one HCCA period is a time needed to transmit the number of packets indicated by the ACK delay value.

After calculating the length of one HCCA period, the communication control unit 16 calculates the number of the HCCA periods within the time interval between the control signal transmissions based on the bandwidth requested for transferring the data and the ACK delay value (step S43).

As shown in FIG. 5, n (the number of the HCCA period within the time interval between the control signal transmissions) can be calculated by the following formula: n=rq/(st). In other words, the number of the HCCA periods can be obtained by dividing (i) rq (bits), which is a size of data to be transferred using HCCA in the time interval between the control signal transmissions, by (ii) st (bits), which is a size of data to be transmitted in one HCCA period.

Following the calculation of n (the number of the HCCA periods within the time interval between the control signal transmissions), the communication control unit 16 generates a control signal that instructs to allocate the EDCA period following each of the HCCA periods. Specifically, each of the HCCA periods and the EDCA periods is allocated so that there are a total of n pairs of the HCCA period and the EDCA period. As there are n pairs of the HCCA period and the EDCA period in total, a length of one pair thereof would be obtained by the following formula: q/n. The communication control apparatus 100 sends the generated control signal (step S44).

Modification Examples

Use of TCP for transmitting data generally leads to the following situations. Immediately after the start of the transmission, an occurrence ratio of the transmissions of the ACK signal, which is a receipt for one or more communication packets, is high. However, the longer the communication time becomes, the less frequently the ACK signal is transmitted/received. That is to say, the ACK delay value is small right after the start of the transmission, but over time, the ACK delay value will gradually become larger. In the case where the data is transmitted in a stable condition, the data transmission will become more efficient by decreasing the occurrence ratio of the transmissions/receptions of the ACK signal.

For example, immediately after the start of the transmission, the ACK signal is transmitted/received each time one packet is transmitted. In the meantime, the ACK signal will eventually be transmitted/received each time a plurality of packets are transmitted.

Also, if the data transmission yields no packet loss for a given time period, the ACK delay value will become and remain at a fixed value.

In this regard, the communication control apparatus 100 may execute processings (e.g., the above steps S42 and S43) based on an occurrence rate of packet communication error, after the occurrence rate of packet communication error falls to or below a predetermined rate (for example, after the rate becomes 1% or below). This can prevent the allocations of each of the HCCA periods within the time interval while the ACK delay value is undergoing a change.

It should be noted that if a transmission error occurs due to packet loss and other reasons, the occurrence ratio of the transmissions/receptions of the ACK signal will increase, just like it does immediately after the data transmission starts. In this case, the communication control apparatus 100 may also execute the processings (e.g., the above step S42) after the error occurrence rate falls to or below the predetermined rate.

The foregoing has described the case where the communication control apparatus 100 executes the processings based on the occurrence rate of packet communication error. Other than this case, the communication control apparatus 100 may wait to execute the processings (e.g., the above step S42) until a given time period has passed since the start of the communication. An example of the above given time period is the time until a start of the stable data transmission, which occurs after the packet loss rate drops to or below a predetermined rate. Or, the above given time period may be the time until the start of the stable data transmission, the time that has been measured in advance. In a case where the communication control apparatus 100 obtains the ACK delay value from the communication terminals 500, the communication terminals 500 may not transmit the ACK delay value until the above given time has passed.

<Additional Information>

Although the communication control apparatus and communication terminals, which constitute the communication system of the present information, have been described above based on the embodiment, they may instead operate as described in the following modification examples. The communication control apparatus and communication terminals described in the above embodiment are not intended to limit the present invention.

(1) The above embodiment has exemplarily described the communication control apparatus and the communication terminals that achieve, in line with the IEEE 802. 11e standard, the QoS control with use of HCCA and EDCA. However, regardless of the IEEE 802. 11e standard, the present invention can be realized in a communication system in which the one-way communication period and the two-way communication period coexist.

Although the above embodiment has used TCP as an, example of the protocol that regulates the transmissions/receptions of the acknowledgement, other protocols may be used instead of TCP.

Under the assumption that the ACK signal is transmitted/received during the EDCA period, the EDCA period follows after the HCCA period in the above embodiment. However, it is not required that the ACK signal transmissions/receptions be performed during the EDCA period. Instead of the EDCA period, the HCCA period may be allocated such that the ACK signal is transmitted over the up-link channel from the communication terminals 500 to the communication apparatus 100.

(2) According to the above embodiment, the communication terminals 500 inform the communication apparatus 100 of the ACK value by including the ACK delay value into the packet that is to be transmitted for delivering the ACK signal. However, the communication control apparatus 100 may obtain the ACK delay value in other ways. For example, the communication terminals 500 may use alternative methods for informing the communication control apparatus 100 of the ACK delay value. Or, the communication control 100 may give a certain instruction to the communication terminals 500 to obtain the ACK delay value therefrom. It should be noted here that the present invention includes the communication terminals 500 that receive the above instruction and transmit the ACK delay value to the communication control apparatus 100.

The communication control apparatus 100 may also measure (i) the number of packets transmitted to the communication terminals 500, (ii) the size of data that is transmitted as packets, and (iii) the number of the ACK signals received from the communication terminals 500, so as to calculate and store the ACK value based on the measurement.

According to the above embodiment, the ACK delay value is expressed based on the number of packets that have been transmitted to the communication terminals. Instead, the ACK delay value may be expressed based on other criteria, such as the size of data that has been transmitted as packets.

(3) In the above embodiment, the length of the HCCA period is explained as the time needed to transmit the number of packets corresponding to one ACK signal, transmission. The length of the HCCA period, however, may be calculated in other methods. For example, the length of the HCCA period may be the time needed to transmit the number of packets corresponding to a plurality of ACK signal transmissions. Or, the length of the HCCA period may be a preset certain time period. A plurality of the HCCA periods and a plurality of the EDCA periods included in the time interval between the control signal transmissions may have different length from one another.

(4) Specifically, each apparatus described above is a computer system comprised of a microprocessor, ROM, RAM, a hard disc unit, a display unit, a keyboard, a mouse, and so on. The RAM or the hard disc contains a computer program stored therein. The devices achieve their functions with the microprocessor operating in accordance with the computer program. Here, the computer program is comprised of a plurality of opcodes that are instructions given to a computer. With this construction the computer program can achieve its certain function.

(5) Part of, or all of components of each apparatus may be comprised of one system LSI (large scale integration). The system LSI is a super-multifunction LSI, specifically a computer system comprised of the microprocessor, ROM, RAM, and so on. The system LSI is manufactured in such a way that a plurality of components are integrated on one chip. The RAM contains the computer program stored therein. The system LSI achieves its function with the microprocessor operating in accordance with the computer program.

(6) Part of, or all of components of each apparatus may be comprised of (i) an IC card that is attachable to and removable from each apparatus, or (ii) a single module. The IC card and the module are each a computer system comprised of the microprocessor, ROM, RAM, and so on, and may include the system LSI described above. The IC card or the module achieves its function with the microprocessor operating in accordance with the computer program. The IC card or the module may be tamper-resistant.

(7) The present invention may be methods that are described above. They present invention may also be a computer program that realizes such methods with use of a computer, or be a digital signal comprised of the computer program.

Furthermore, the present invention may be a computer-readable recording medium storing the computer program or the digital signal. The computer readable recording medium includes a flexible disc, a hard disc, a CD-ROM, an MO, a DVD, a DVD-ROM, a DVD-RAM, a BD (Blu-ray Disc), a semiconductor memory, and so on. Or, the present invention may be the computer program or the digital signal being recorded onto/into the above computer-readable recording medium.

The present invention may be the computer program or the digital signal that are transmitted via an electric communication network, a wireless or wired communication network, a network (typically the Internet), a data broadcast, and so on.

Furthermore, the present invention may be a computer system including a microprocessor and a memory, the memory storing the computer program therein. The microprocessor may operate in accordance with the computer program.

Furthermore, the present invention may be executed by another independent computer system, by having the computer program or the digital signal stored onto/into the above recording medium and transferred, or by having the computer program or the digital signal transferred via the network.

(8) The present invention may be any combination of the embodiment and modification examples described above.

INDUSTRIAL APPLICABILITY

In a communication network in which audio-visual data such as MPEG2-TS is transmitted, the communication control apparatus and the communication terminals of the present invention can be used for achieving the QoS control using a protocol (e.g., TCP) that regulates the transmissions/receptions of the acknowledgement. The communication control apparatus and the communication terminals are advantageous when used for distributing videos and for other purposes.

The invention claimed is:

1. A communication control apparatus for controlling communication by repeatedly sending a control signal to other apparatuses at a given time interval, the communication using a protocol that regulates transmissions of an acknowledgement as a receipt for one or more communication packets, and the control signal allocating, within the given time interval, two types of communication periods which are (i) a one-way communication period in which a one-way communication is performed and (ii) a two-way communication period in which a two-way communication is performed, the communication control apparatus comprising:
   a storing unit in which an occurrence ratio of the transmissions of the acknowledgement is stored;
   a determination unit operable to determine, based on the stored occurrence ratio of the transmissions of the acknowledgement, a length of the one-way communication period; and
   a communication control unit operable to generate and send the control signal that allocates a plurality of the one-way communication periods each of which has the determined length.

2. The communication control apparatus of claim 1, wherein
   the determination unit determines, based on the stored occurrence ratio of the transmissions of the acknowledgement, the length of each of the one-way communication periods to be a time needed for the communication control apparatus to transmit data as the one or more communication packets, a size of the data corresponding to a predetermined number of the acknowledgements.

3. The communication control apparatus of claim 1, further comprising:
   a measuring unit operable to, if transmitting the one or more communication packets to one of the other apparatuses, measure the occurrence ratio of the transmissions of the acknowledgement based on a number of the received acknowledgements from the one of the other apparatuses, each of the received acknowledgements corresponding to a size of data that is transmitted as the one or more communication packets, wherein
   the measured occurrence ratio of the transmissions of the acknowledgement is stored in the storing unit.

4. The communication control apparatus of claim 1, further comprising:
   an acquisition unit operable to, if transmitting the one or more communication packets to one of the other apparatuses, acquire the occurrence ratio of the transmissions of the acknowledgement from the one of the other apparatuses, wherein
   the acquired occurrence ratio of the transmissions of the acknowledgement is stored in the storing unit.

5. A communication terminal for performing communication using a protocol that regulates transmissions of an acknowledgement as a receipt for one or more communication packets in accordance with the control signal sent by the communication control apparatus of claim 4, the communication terminal comprising:
   a communication unit operable to transmit and receive the one or more communication packets, and
   a notifying unit operable to, if receiving the one or more communication packets from the communication control apparatus, notify the communication control apparatus of an occurrence ratio of the transmissions of the acknowledgement.

6. A communication control method for controlling communication by repeatedly sending a control signal to other apparatuses at a given time interval, the communication using a protocol that regulates transmissions of an acknowledgement as a receipt for one or more communication packets, and the control signal allocating, within the given time interval, two types of communication periods which are (i) a one-way communication period in which a one-way communication is performed and (ii) a two-way communication period in which a two-way communication is performed, the communication control apparatus comprising:

- a storing step of storing an occurrence ratio of the transmissions of the acknowledgement;
- a determination step of determining; based on the stored occurrence ratio of the transmissions of the acknowledgement, a length of the one-way communication period; and
- a communication control step of generating and sending the control signal that allocates a plurality of the one-way communication periods each of which has the determined length.

7. A communication method of a communication terminal for performing communication using a protocol that regulates transmissions of an acknowledgement as a receipt for one or more communication packets, the communication being performed in accordance with the control signal sent by the communication control apparatus of claim 4, the communication method comprising:

- a communication step of transmitting and receiving the one or more communication packets, and
- a notifying step of, if receiving the one or more communication packets from the communication control apparatus, notifying the communication control apparatus of an occurrence ratio of the transmissions of the acknowledgement.

* * * * *